(12) United States Patent
Branch

(10) Patent No.: US 7,353,615 B1
(45) Date of Patent: Apr. 8, 2008

(54) ANTI-VIBRATION TILT DETECTOR

(75) Inventor: Clint Branch, Jacksboro, TX (US)

(73) Assignee: ShockWatch, Inc., Graham, TX (US)

( * ) Notice: Subject to any disclaimer, the term of this patent is extended or adjusted under 35 U.S.C. 154(b) by 0 days.

(21) Appl. No.: 11/752,569

(22) Filed: May 23, 2007

Related U.S. Application Data (60) Provisional application No. 60/878,281, filed on Jan. 3, 2007.

(51) Int. Cl.
*G01C 15/10* (2006.01)

(52) U.S. Cl. .................. 33/366.11; 33/366.21; 33/391

(58) Field of Classification Search ........... 33/366.11, 33/366.12, 366.21, 366.23, 366.24, 391
See application file for complete search history.

(56) References Cited

U.S. PATENT DOCUMENTS

| | | | |
|---|---|---|---|
| 3,212,701 A | 10/1965 | Smith | |
| 3,880,108 A | 4/1975 | Anton | |
| 3,923,000 A | 12/1975 | Cloyd | |
| 4,135,472 A | 1/1979 | Chesla et al. | |
| 4,340,008 A | 7/1982 | Mendelson | |
| RE32,570 E | 1/1988 | Conn | |
| 4,924,799 A | 5/1990 | Rilling | |
| 4,972,595 A | 11/1990 | Shimamura et al. | |
| 4,989,334 A | 2/1991 | DuBose, Jr. | |
| 5,765,290 A | 6/1998 | Rank et al. | |
| 6,115,929 A | 9/2000 | Tanazawa et al. | |
| 6,341,428 B1 | 1/2002 | Tanazawa et al. | |
| 6,449,858 B1 * | 9/2002 | Reay et al. | 33/366.12 |
| 6,723,979 B2 * | 4/2004 | Kastura | 33/366.23 |
| 7,305,771 B2 * | 12/2007 | Lin | 33/366.24 |
| 7,318,283 B2 * | 1/2008 | Kurose et al. | 33/366.24 |
| 2005/0248467 A1 | 11/2005 | Igami et al. | |

* cited by examiner

*Primary Examiner*—Yaritza Guadalupe-McCall
(74) *Attorney, Agent, or Firm*—Geoffrey A. Mantooth; Brian K. Yost (57) ABSTRACT

The tilt detector has a container with a receptacle located therein. The receptacle has open and closed ends. In its normal, upright orientation, a first mass is located inside of the receptacle. A second mass is located adjacent to the open end of the receptacle. When the receptacle is in its normal, upright orientation, the second mass is located above the receptacle and blocks the exit of the first mass from the receptacle even when the first mass moves in response to vibration frequencies to which the first mass is sensitive. When the receptacle is tilted beyond a predetermined angle, the second mass moves from its blocking position so as to allow the first mass to exit the receptacle. A tilting indication occurs when the first mass has exited the receptacle.

19 Claims, 9 Drawing Sheets

ANTI-VIBRATION TILT DETECTOR

This application claims the benefit of U.S. Provisional Patent Application No. 60/878,281, filed Jan. 3, 2007.

BACKGROUND OF THE INVENTION

1. Field of the Invention

The present invention relates to a sensor with an anti-vibration aspect for determining whether an object, such as a shipping carton, has been upended, turned over, or tilted at greater than a predetermined angle.

2. Description of the Prior Art

In today's global economy, goods, materials, manufactured articles, and the like are often transported great distances before reaching their final destination. The shipping process may involve multiple transportation methods. For instance, it is not uncommon for a product manufactured in Asia, to be loaded on a truck, transported to a rail station, loaded onto a railcar, transported by rail to a port, loaded onto a cargo ship, transported overseas to a port, loaded onto a truck, transported over road by truck, and delivered to a warehouse. Once at the warehouse, the product may again be shipped via air or ground before reaching the ultimate user of the product. During this process, the product may be loaded and unloaded many times and occasionally damaged as a result of mishandling. Some products are susceptible to damage if they are not transported in a certain position. For example, some computer hard drives are known to malfunction if they are turned on their sides or upside down.

Various measures are well known in the art to help prevent mishandling of products during transportation and loading and unloading. Such measures include stenciling instructions onto crates to maintain the predetermined orientation. However, these precautions are passive in nature, and do nothing to alert the recipient as to whether the product has been improperly handled or whether damage resulted from shipment.

To address these concerns, various devices were developed that indicated on arrival of materials to their destination as to whether the container had been transported in the recommended position or had been tilted beyond the maximum predetermined angle. An example of one such device is described in Conn, U.S. Reissue Pat. No. 32,570. The Conn tilt detector has proven to be commercially successful.

The Conn tilt detector is susceptible to false activation at some vibration frequencies. What is needed is a device containing an anti-vibration feature so that the device will more accurately indicate whether the material has been mishandled and eliminate false indications of tilting.

SUMMARY OF THE INVENTION

It is an object of the invention to provide a sensor with an anti-vibration aspect for determining whether an object, such as a shipping carton, has been upended, turned over, or tilted at greater than a predetermined angle.

The present invention provides a tilt detector that comprises a container and a receptacle located within the container. The receptacle has closed and open ends and sides extending between the two ends. A first mass is located within the receptacle when the receptacle is upright with the open end above the closed end. The first mass is capable of exiting the receptacle when the receptacle tilts beyond a predetermined angle. A second mass is located above the receptacle open end when the receptacle is upright, whereby the second mass blocks the exit of the first mass from the upright receptacle. The second mass moves when the receptacle tilts beyond the predetermined angle to allow the first mass to exit the receptacle.

In accordance with one aspect of the present invention, the second mass is suspended from a pivot point spaced from and located above the receptacle open end when the receptacle is upright. The second mass pivots away from the receptacle open end when the receptacle tilts beyond its predetermined angle.

In accordance with another aspect of the present invention, the first mass responds to first vibrational frequencies and the second mass responds to second vibrational frequencies. The second vibrational frequencies are different from the first vibrational frequencies.

In accordance with still another aspect of the present invention, the first and second masses have different masses.

In accordance with still another aspect of the present invention, the first and second masses are made of different materials.

In accordance with still another aspect of the present invention, the second mass has extensions forming at least two outside lateral cavities having dimensions larger than the first mass and for blocking reentry of the first mass into the receptacle after exiting the receptacle.

The present invention also provides a tilt detector that comprises a container, and a receptacle. The receptacle has open and closed ends with sides extending between the two ends. A first mass is located within the receptacle when the receptacle is upright with the open end above the closed end. The first mass is capable of exiting the receptacle when the receptacle tilts beyond a predetermined angle. A pivot pin is coupled to the container located adjacent to the opening of the receptacle. A second mass is pivotally coupled to the pivot pin. The second mass has a blocking portion, the blocking portion blocking the open end of the receptacle when the receptacle is upright.

In accordance with another aspect of the present invention, the container is thin so that the first mass moves within the container in only two dimensions.

In accordance with still another aspect of the present invention, the second mass has ribs on at least one side.

In accordance with another aspect of the present invention, the second mass has ribs on both sides, with the ribs on one side being offset from the ribs on the other side.

In accordance with still another aspect of the present invention, the second mass has extensions forming at least two outside lateral cavities with dimensions larger than the first mass and for blocking reentry of the first mass in the receptacle after exiting the receptacle.

In accordance with still another aspect of the present invention, an arming pin can be inserted into a notch in the second mass to prevent movement in the second mass.

In accordance with still another aspect of the present invention, at least a portion of the face of the container is transparent.

In accordance with still another aspect of the present invention, the first mass is of a first color and the inside surface of a back of the container is of a second color.

In accordance with still another aspect of the present invention, the pivot pin has plural radii circumscribed by a single circle.

In accordance with still another aspect of the present invention, the second mass is a lower edge which has a radius and a flat portion.

The present invention also provides a method of preventing accidental activation of a tilt detector due to vibration. A receptacle is provided with a first mass located therein. The receptacle has open and closed ends. The exit of the first mass from the receptacle through the open end due to vibration is blocked by locating a blocking mass over the open end. The blocking mass is moved away from the receptacle open end when the receptacle is tilted beyond predetermined angle to allow the first mass to exit.

In accordance with another aspect of the present invention, the step of moving the blocking mass further comprises the step of swinging the blocking mass away from the open end.

In accordance with another aspect of the present invention, the step of blocking the exit of the first mass from the receptacle open end by locating a blocking mass over the open end further comprises suspending the blocking mass over the receptacle open end.

BRIEF DESCRIPTION OF THE DRAWINGS

FIGS. 2-6 are drawings depicting the tilt detector in various orientations.

DESCRIPTION OF THE PREFERRED EMBODIMENT

Figure 1:
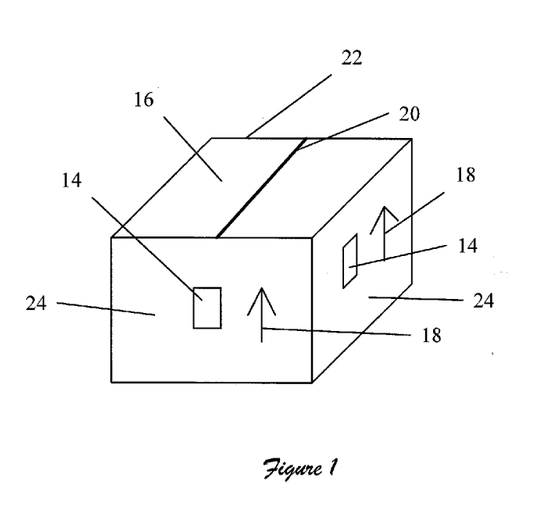
FIG. 1 is an isometric view of a shipping package with a pair of tilt detectors affixed on the exterior walls.

Referring to FIG. 1, an object, such as a shipping package 22, has one or more tilt detectors 14 affixed on one or more walls 24 thereof for determining whether the package has been maintained in its recommended orientation during shipment and not tilted beyond a predetermined maximum angle. The shipping package 22 may be of any of the conventional forms, such as crates, pallets, boxes, cartons, barrels, drums, cans, bottles or other containers emplaced about the goods before shipping. Alternatively, the tilt detector(s) 14 could be placed directly onto the goods themselves. Thus, an object bearing a tilt detector 14 could be goods, a container bearing goods, etc. The shipping package 22 has a top side 16 (shown with a seam 20 between the box flaps). An "up" arrow 18 is placed on one or more sides of the package 22 to indicate that the top side 16 should remain on top at all times. Thus, the package 22 is marked to prevent tipping or tilting.

In order to detect any such unauthorized tilting, tilt detectors 14 are used. The tilt detector 14 is preferably placed on an upright or side wall 24 of the shipping package 22 when in the upright position. In the preferred embodiment, the tilt detector 14 is sensitive in two dimensions, namely in the plane of the detector. Thus, the tilt detector 14 may be used in combination with another tilt detector 14 placed on an adjacent side wall 24 of the package 20 wherein the two tilt detectors 14 are transverse to one another.

The entire disclosure of Conn, U.S. Pat. No. Re 32,570 is incorporated herein by reference.

Figure 2:
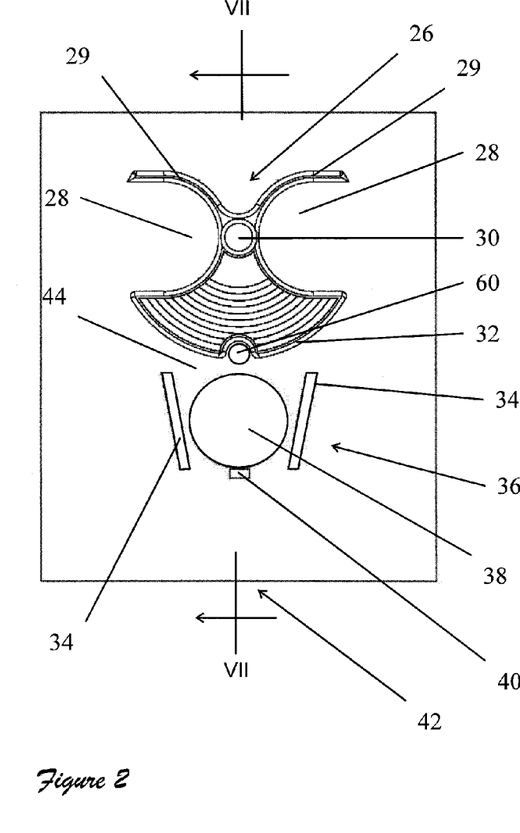
FIG. 2 is a front elevational view of the tilt detector of the present invention in accordance with a preferred embodiment showing the tilt detector in its upright position, the hanging mass in the blocking position, and the disc within the retaining receptacle.

Referring to FIG. 2, in general, the tilt detector 14 has a receptacle 36 that has a closed end 40, an open end 44, and sides 34 that extend between the closed 40 and open ends 44. The receptacle, which may also be referred to as a retaining receptacle, receives a mass. In the preferred embodiment, the mass is a disc because the tilt detector is thin. The receptacle 36 may be in the form of a V-shape or flared horseshoe shape with the base 40 of the V or horseshoe located near the base of the tilt detector 14, and the open end 44 located above the closed end 44 when the detector 14 is in the upright, or vertical, position. The sides 34 of the V or horseshoe extend from the base 40 of the receptacle at angles relative to one another so as to allow a first mass 38 or disc to rest within the cavity formed by the sides 34 and to escape the receptacle 36 when the tilt detector 14 is inclined beyond a predetermined angle. In the normal, upright orientation of the tilt detector, the disc 38 is located inside of the receptacle 36. When the receptacle 36 is tilted beyond a predetermined angle, the disc 38 exits the receptacle 36. This angle is generally the angle at which a side 34 is oriented at or below horizontal. For example, when the detector is tilted to say, 80° from its upright orientation, then the disc 38 can exit the receptacle 36. The slope or angle of the receptacle sides 34 determines the angle at which the detector 14 will become activated. The detector 14 is bi-directional, and is activated by tilting the detector 14 beyond the predetermined angle towards either side 34 of the receptacle 36.

Occasionally, the disc 38 will move in response to vibrational frequencies to which the disc 38 is sensitive or responsive. This movement may cause the disc to escape from the receptacle even in the absence of receptacle 36 tilting, resulting in a false indication of tilting. In order to prevent such a false indication under this set of vibrational frequencies, the exit is blocked by a second mass or hanging mass 26. The hanging mass 26 is suspended adjacent to the open end 44. When the receptacle 36 is in its normal, untilted orientation, the hanging mass 26 blocks the exit of the disc 38 from the receptacle 36. Thus, even if vibration moves the disc 38 toward the open end 44, the tilt detector 14 does not activate. The hanging mass 26 is not sensitive or responsive to the same vibrational frequencies as the disc 38. Instead, the hanging mass is responsive to a second set of vibrational frequencies. The hanging mass 26, while preventing false activation, does not interfere with normal operation of the detector 14. When the receptacle 36 is tilted beyond the predetermined angle, the hanging mass 26 moves so as to allow the disc 38 to exit the receptacle 36. A tilting indication occurs when the disc 38 has exited the receptacle 36.

Figure 7:
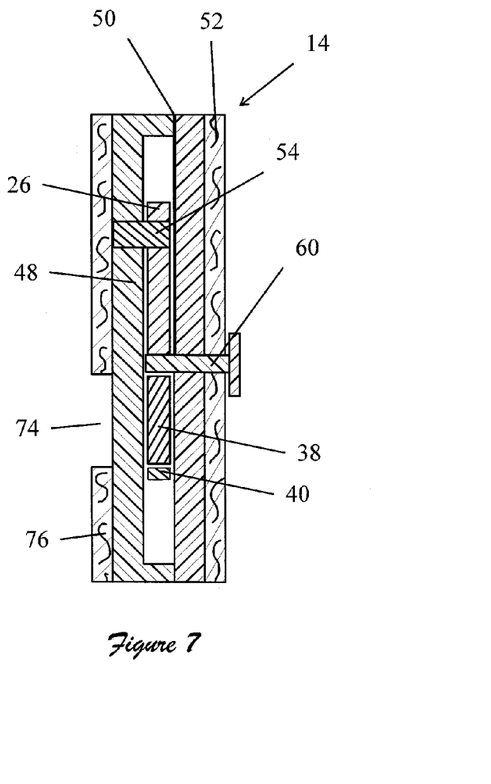
FIG. 7 is a cross-sectional view taken along the lines VII-VII of FIG. 2.
Figure 12:
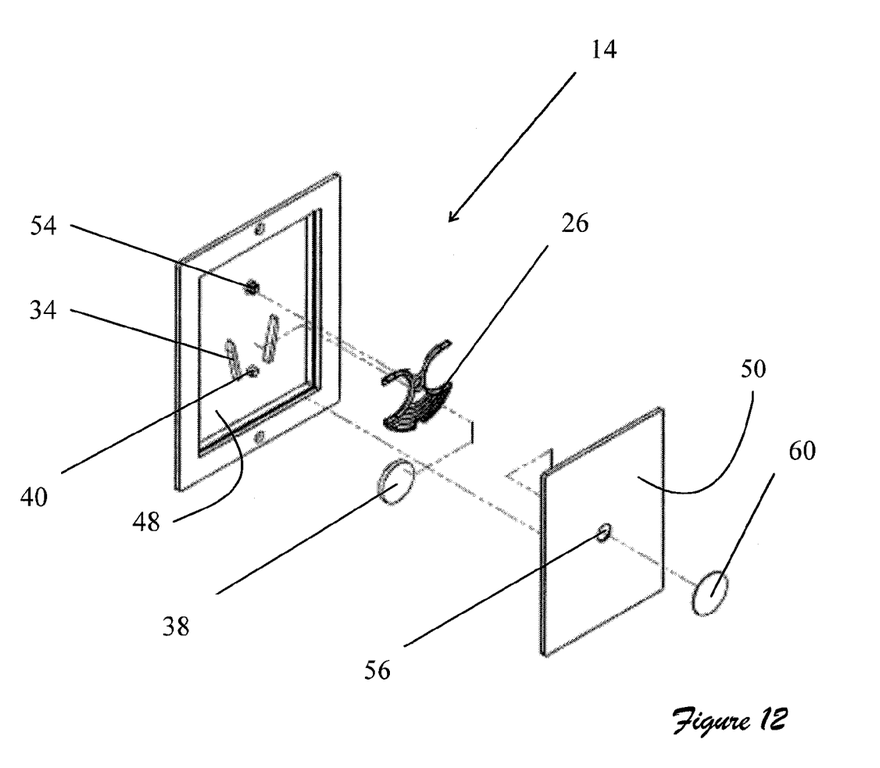
FIG. 12 is an exploded view of the tilt detector and component parts.

Referring to FIGS. 7 and 12, the tilt detector 14 has a thin container 42 having a face 48, back 50, and sides 46, with the face 48 having at least a transparent window 74, with the back 50 having a layer of adhesive 52, and a removable arming pin 60. The window 74 is formed by an opening in a label 76 on the face 48. Because the detector 14 is thin, it has a low profile when attached to an object 22.

The receptacle 36 is located within the container. The face 48 and back 50 of the container form sides of the receptacle. Because the container is thin, the disc can only move in two dimensions, for practical purposes. There is some minimal movement in the third dimension, between the face 48 and back 50.

The hanging mass 26 is a piece of dense material such as steel or polycarbonate. In the preferred embodiment, the hanging mass 26 is formed from polycarbonate and is flat. The hanging mass 26 has a pivot point 30 around which the hanging mass 26 pivots in a plane parallel with the face 48 and back 50, and a blocking portion or mass 32 with sufficient mass and offset from the pivot point 30 to enable it to pivot. The blocking portion 32 is always located below the pivot point 30 due to gravity. The hanging mass can rotate 360° about the pivot point within the container. While the receptacle is upright, as shown in FIG. 2, the blocking portion 32 blocks the disc 38 from exiting the receptacle 36. The blocking portion 32 is shaped in such a way so as to block the open end 44 of the receptacle 36 and prevent the disc 38 from escaping the retaining receptacle 36 unless the container 22 is tilted beyond the predetermined angle. The blocking portion 32 is shaped in such a way as to allow the hanging mass 26 to pivot freely about its pivot point 30.

The hanging mass 26 has at least two lateral wings 29 or arms located above the blocking portion 32, as shown in FIG. 2. The wings 29 are located on the opposite side of pivot point 30 from the blocking portion 32 and form lateral cavities 28 at least slightly larger than the diameter of the disc 38. Although the preferred embodiment has lateral cavities 28, the tilt detector 14 without lateral cavities 28 will prevent the escape of the disc 38 in the presence of vibrational frequencies to which the disc 38 is sensitive. The wings 29 of the hanging mass 26 prevent reentry of the disc 38 upon escape from the receptacle 36.

Figure 9:
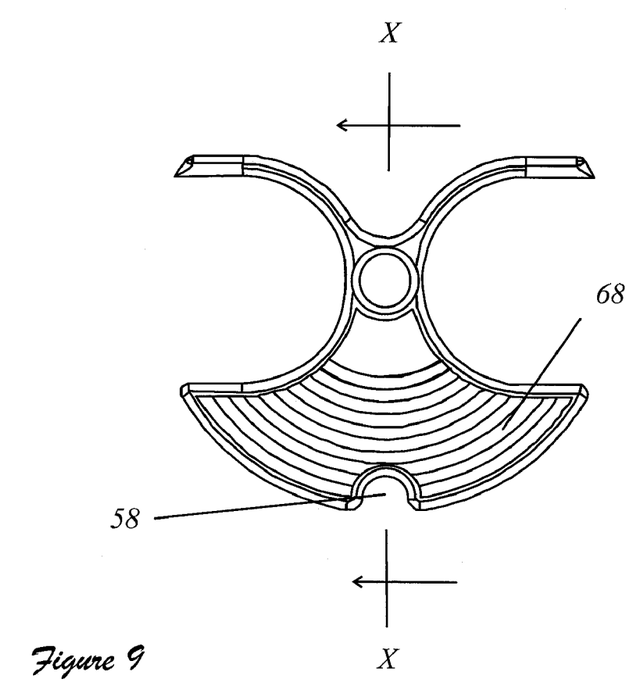
FIG. 9 is a front view of the hanging mass.
Figure 10:
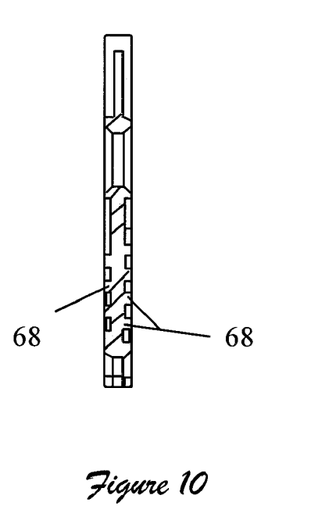
FIG. 10 is a cross-sectional view taken along lines X-X of FIG. 9.
Figure 11:
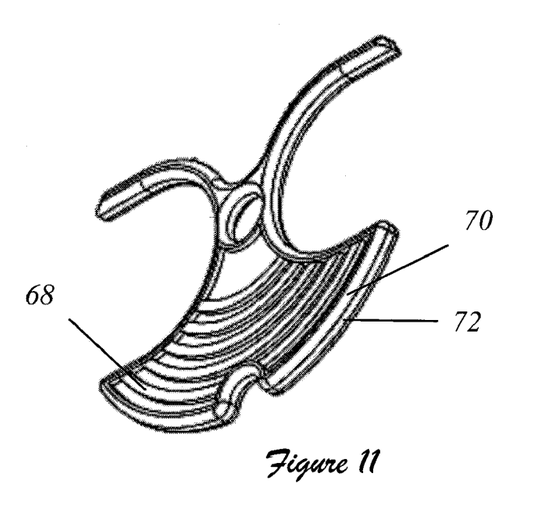
FIG. 11 is an isometric view of the front, left, and lower sides of the hanging mass.

The hanging mass 26 in the preferred embodiment is injection molded and is a precision part that needs to be flat to freely swing or pivot within the container. Referring to FIGS. 9, 10, and 11, the hanging mass 26 of the preferred embodiment has ribs 68 spanning the front and back sides of the blocking portion 32 and a notch 58 in the bottom edge. The ribs 68 on the front side of the blocking portion 32 of the hanging mass 26 are offset from those on the back side of the hanging mass 26. The ribs allow the hanging mass 26 to be molded and achieve the desired flatness. In the preferred embodiment, the lower edge of the hanging mass 26 has a radius 70 with flat portion 72, as shown in FIG. 11. This flat portion 72 facilitates the manufacturing process. The notch 58 of the hanging mass 26 aligns with a hole 56 in the back 50 of the tilt detector 14 when the detector 14 is in the upright position depicted in FIG. 2.

The disc 38, which in the preferred embodiment is made of metal, is of sufficient mass to cause the hanging mass 26 to pivot once the disc 38 escapes the receptacle 36 and enters one of the lateral cavities 28. The disc 38 or mass and the hanging mass 26 are of different masses, are made of different materials, and are different shapes so that the two masses 38, 26 are responsive to different vibrational frequencies. The pivot point 30 is located above the center of mass of the hanging mass 26 so as to allow the blocking portion 32 to settle at the lowest point of the hanging mass 26 relative to the earth. The hanging mass 26 may be suspended in any conventional way that will allow it to rotationally pivot around a pivot point 30. For instance, in the preferred embodiment, the hanging mass 26 has a hole at the pivot point 30 through which a pivot pin 54 extends from the face 48 of the detector 14 through the hanging mass 26, as shown in FIG. 7.

Figure 3:
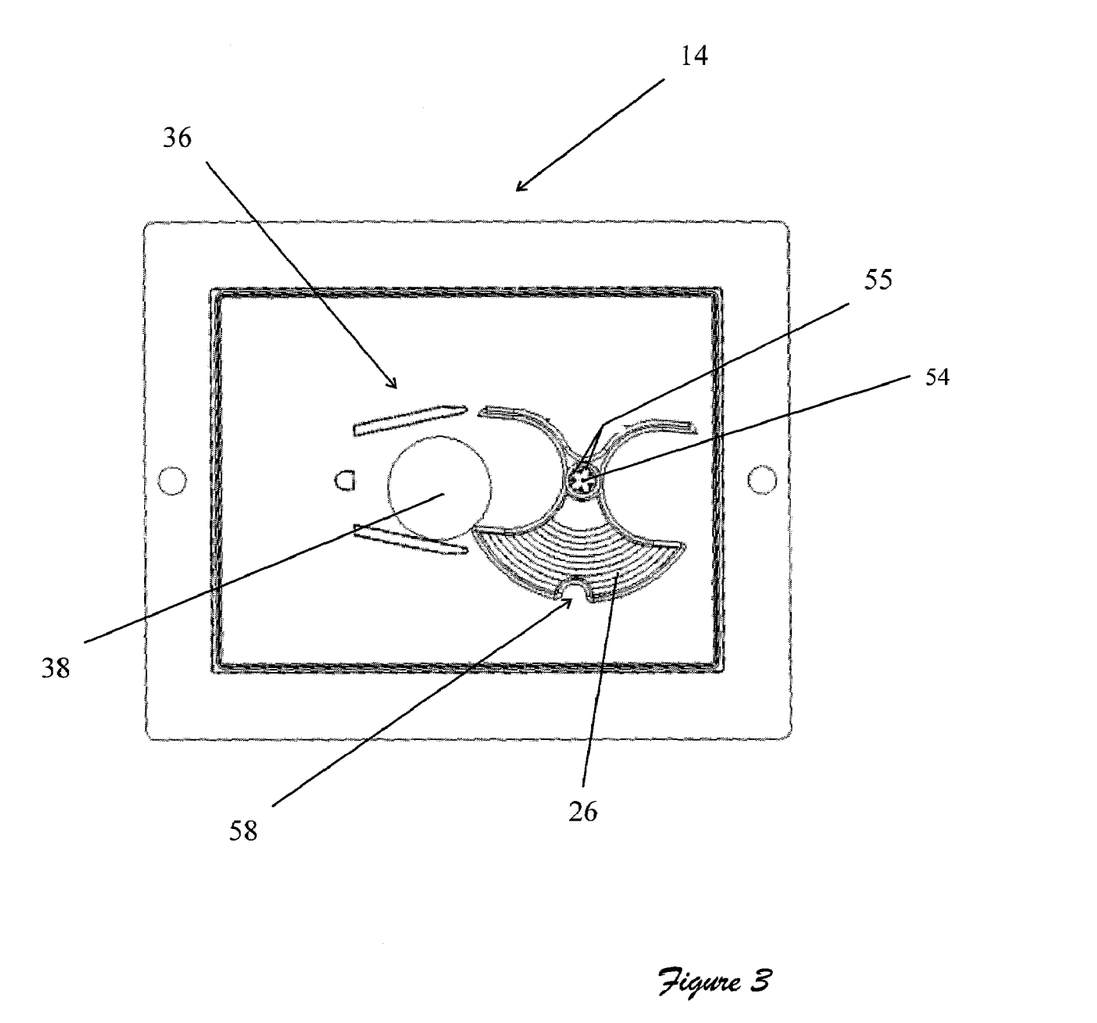
FIG. 3 is a front elevational view of the tilt detector of FIG. 2 depicting the detector rotated ninety degrees from its upright position, the hanging mass after it has pivoted ninety degrees, and the disc exiting the retaining receptacle.

The pivot pin 54 could be cylindrical. In the preferred embodiment, the pivot pin 54 is shaped with indentions to reduce the surface area contacting the hanging mass 26. As shown in FIG. 3, the pivot pin 54 is star-shaped, with the ends 55 of the star being rounded. The ends 55 have a radius that is smaller than the radius of the pivot pin. The ends 55 are circumscribed by a circle that forms the outside diameter of the pivot pin. This arrangement allows the hanging mass 26 to freely move about the pivot pin 54. Although the hanging mass 26 of the preferred embodiment rotates about the pivot point 30, the mass 26 need not be pivotally attached to the pivot pin 54. Instead, the mass 26 may slide in a groove or slot in the container 42 to allow movement of the mass 26 while allowing the disc to escape the receptacle 36 only upon tilting of the receptacle 36 beyond the predetermined angle. Thus, the mass 26 can move away from the receptacle to allow the disc 38 to escape, when the receptacle is tilted by rotation, by translation, or a combination of rotation and translation.

The face 48 of the container 42 is at least transparent at the window 74. The back 50 of the container 42 may be formed of any conventional material such as metal or plastic. In the preferred embodiment, the front surface of the disc 38, viewable through the window 74, is of one color, while the back 50 wall of the housing 42 is of another color that readily reveals whether the disc 38 has escaped the retaining receptacle 36. The face 48 of the container 42 and back 50 are affixed together so as to confine the disc 38 and hanging mass 26 to lateral movements. As shown in FIG. 12, in the preferred embodiment, the container 42 has the face 48 and sides 46 in an integral piece, with a shoulder for receiving the back 50, so as to form a flat, flush fit of the back into the container.

Figure 8:
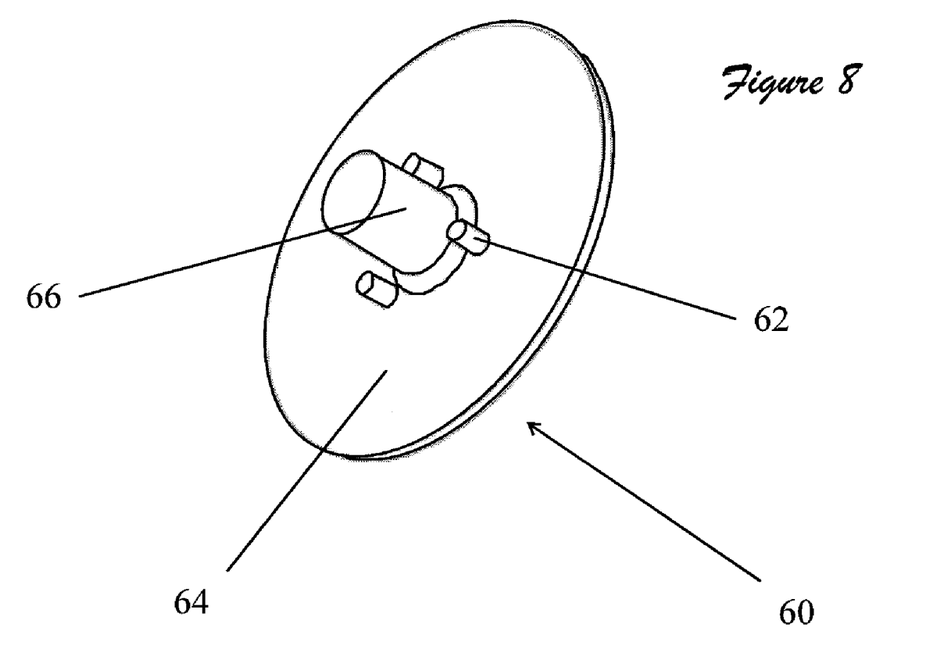
FIG. 8 is an isometric view of the arming pin.

A mechanism is provided to prevent activation until ready. Extending through the rear of the container 42 of the detector 14 at a point just above the disc 38 when the disc 38 is confined in the retaining receptacle 36 and is in the inactivated upright position depicted in FIGS. 2 and 7, there is a removable retaining device such as an arming pin 60, as shown in FIG. 8. This arming pin 60 prevents the disc 38 from escaping the receptacle 36 and remains in place until such time as the pin 60 is removed and the detector 14 is placed into service. In the preferred embodiment, the arming cylinder 66 of the arming pin 60 is inserted through a hole in the back 50 of the detector, through a corresponding cavity 58 (see FIG. 9) in the hanging mass 26. The arming pin 60 of the preferred embodiment has a base 64, stand off posts 62, and an arming cylinder 66. When in the unarmed position, the arming pin 60 is in place and maintains the hanging mass 26 in the blocking position and prevents the disc 38 from escaping the retaining receptacle 36 regardless of the orientation or tilt thereof.

Figure 4:
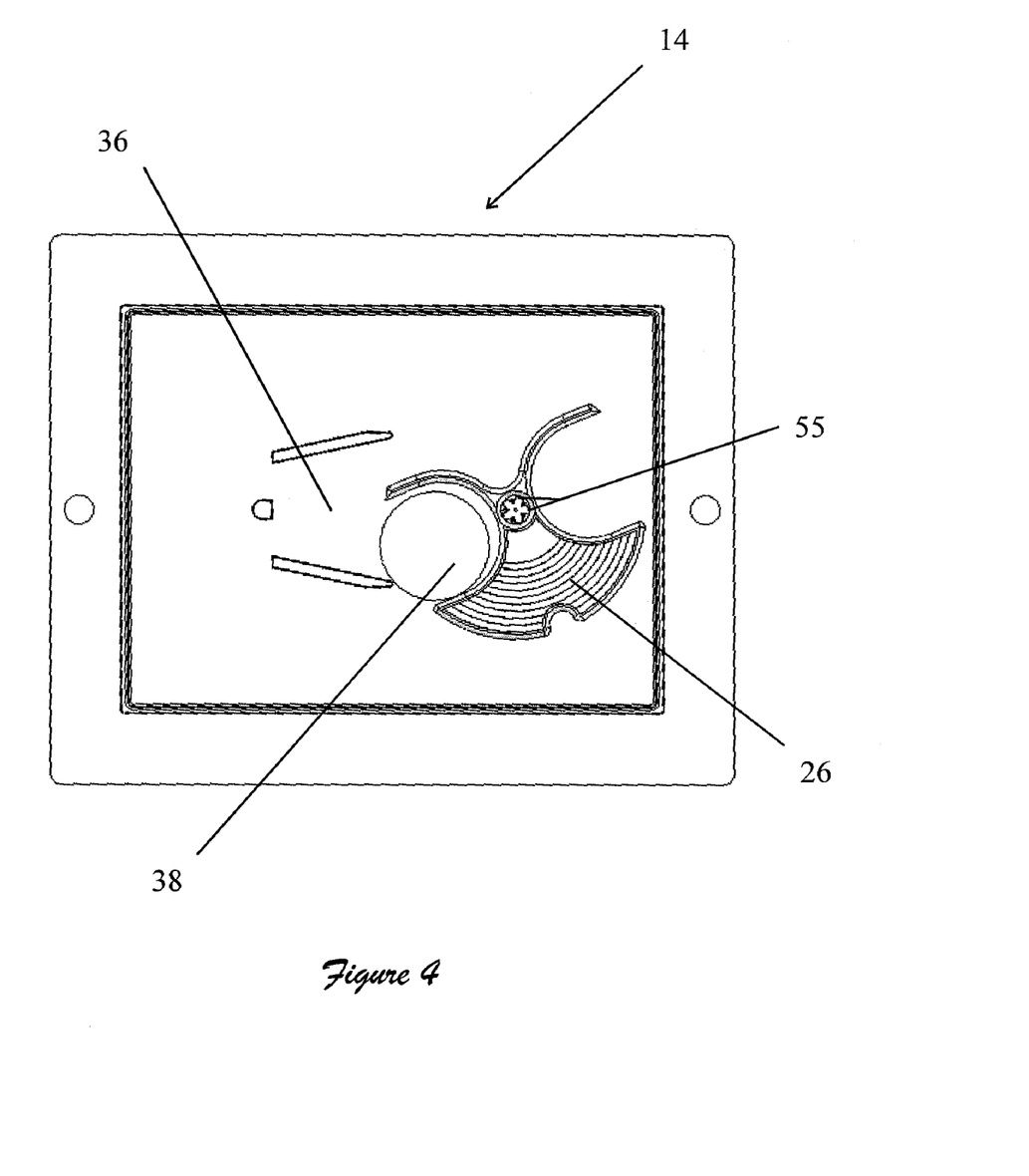
FIG. 4 is a front elevational view of the tilt detector of FIG. 2 depicting the detector rotated ninety degrees from its upright position, the disc within one of the lateral cavities of the hanging mass the disc escaping the retaining receptacle.
Figure 5:
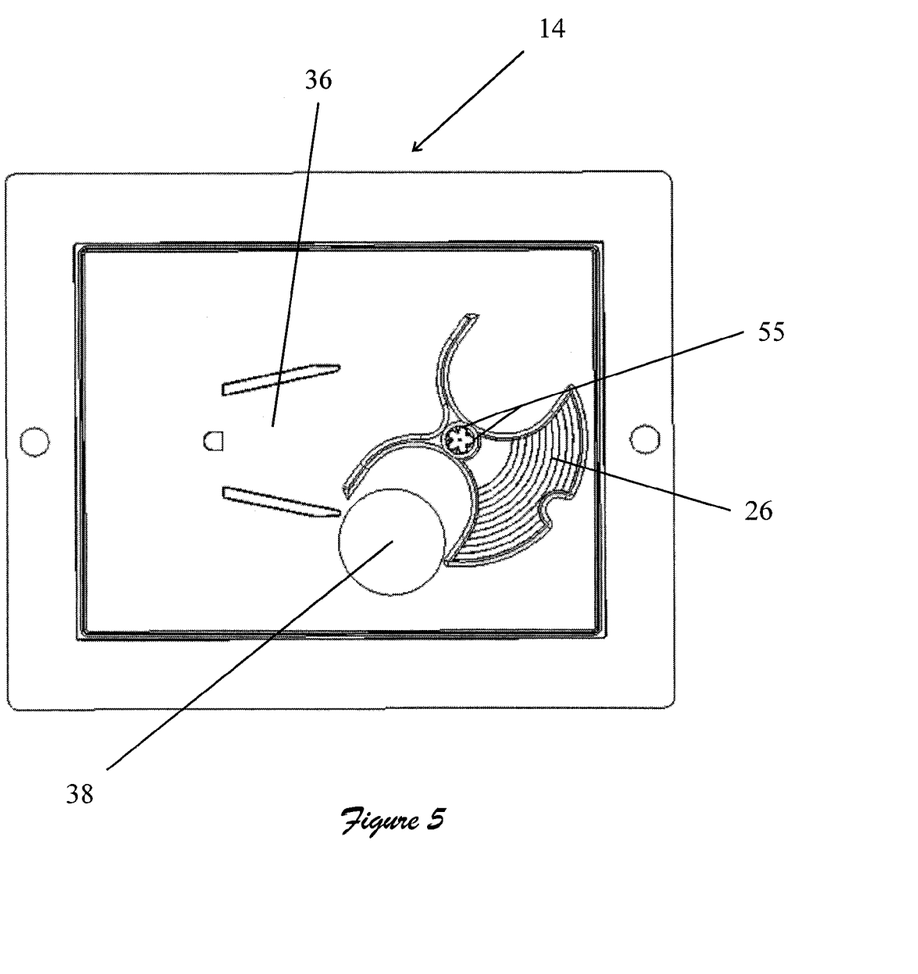
FIG. 5 is a front elevational view of the tilt detector of FIG. 2 depicting the detector rotated ninety degrees from its upright position, the hanging mass pivoted about one hundred thirty-five degrees from its upright position, the disc falling from the lateral cavity of the hanging mass.
Figure 6:
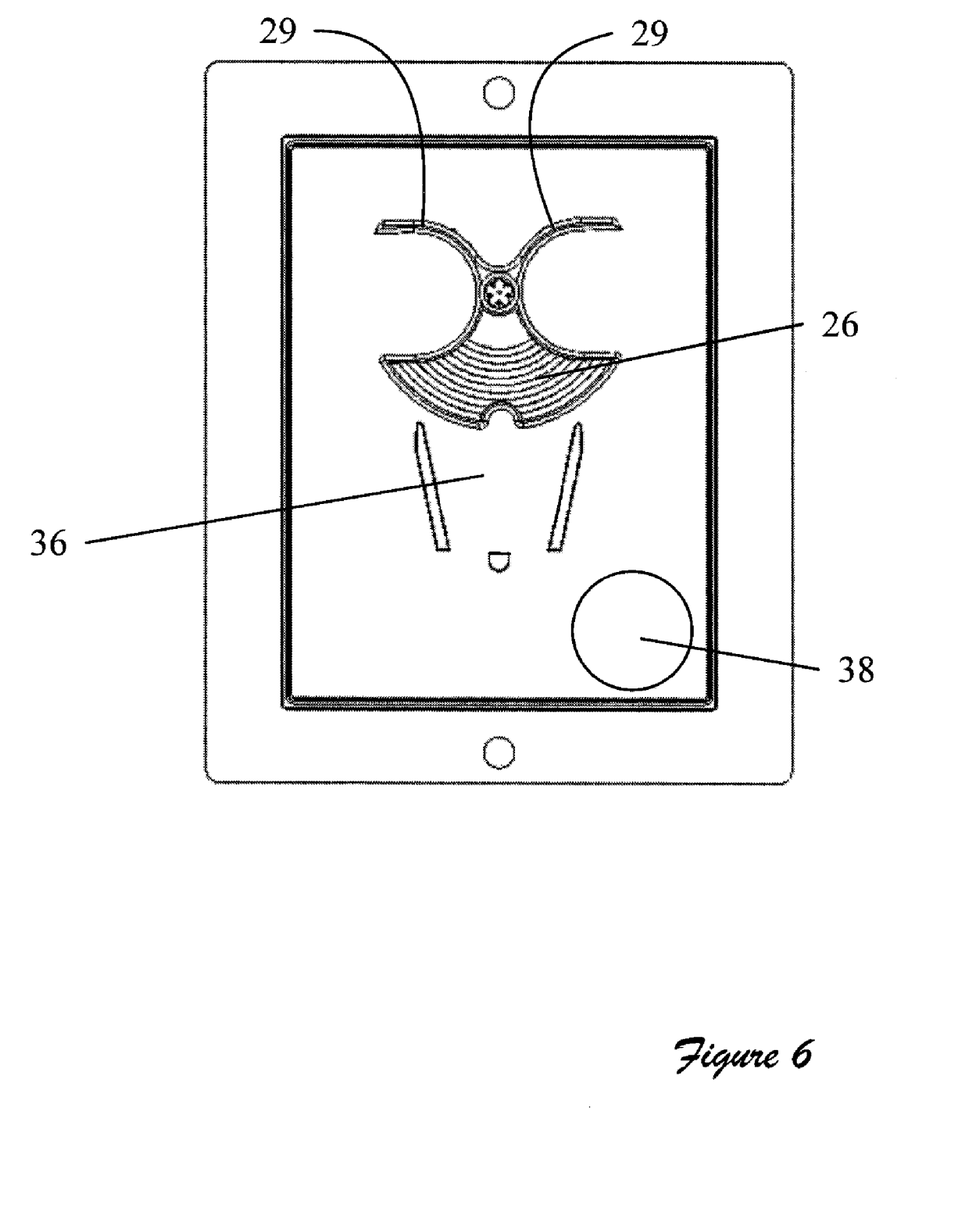
FIG. 6 is a front elevational view of the tilt detector of FIG. 2 depicting the detector returned to its upright position, the hanging mass in its upright blocking position, the disc resting at the base of the detector after having escaped the retaining receptacle.

The operation and use of the tilt detector 14 of the preferred embodiment will now be described. The detector 14 is first made operational by removing the arming pin 60 from the back of the detector 14. The detector 14 is then placed in the upright and inactivated position on an upright wall 24 of the shipping package 22. The detector 14 may be used singularly or in conjunction with another detector 14 placed on an adjacent upright wall 24 of the shipping package 22. Once made operational, the disc 38 will remain within the confines of the retaining receptacle 36 (FIG. 2) until the shipping package 22 is tilted beyond a predetermined maximum angle. If the package 22 is tilted beyond this predetermined maximum angle, the hanging mass 26 will move from the blocking position to the open position (FIG. 3). The disc 38 will then exit the receptacle 36 (FIG. 4) and enter the exposed lateral cavity 28 of the hanging mass 26. The weight of the disc 38 within the lateral cavity 28 will further cause the hanging mass 26 to pivot (FIG. 5). The disc 38 will then fall from the lateral cavity 28 into the non-receptacle part of the container. Once the shipping package 22 is re-oriented to the upright position, as depicted in FIG. 6, the hanging mass 26 returns to the blocking position depicted in FIG. 2 and the disc 38 remains outside the retaining receptacle 36.

Thus, the hanging mass 26 acts as a pendulum, maintaining its orientation due to gravity. When the receptacle is upright, the hanging mass blocks the receptacle open end. When the receptacle is tilted, the hanging mass moves and no longer blocks the receptacle open end.

With the disc 38 located outside the retaining receptacle 36, the contrasting color on the back of the container 42 may be seen through the window 74, and a user may readily ascertain that the shipping package 22 has been tilted beyond the predetermined maximum angle.

Occasionally during shipping, some vibration frequencies are known to cause the disc to gradually move from the base 40 of the retaining receptacle 36 to the open end 44. The blocking portion 32 of the hanging mass 26 suspended above the disc 38 while the detector 14 is in the inactivated position depicted in FIG. 2 prevents the disc 38 from escaping the receptacle 36 because the vibration frequencies do not cause the blocking portion 32 to move to the open position. The tilt detector 14 of the present invention will become activated only as a result of tilting beyond the predetermined maximum angle. Once activated, the wings 29 of the hanging mass 26 prevent the disc 38 from re-entering the receptacle 36 under vibrational motion.

Although the tilt detector 14 has been described as providing visual indications of tilt, other indications can be provided, such as electronically sensing the movement of the disc.

Although the tilt detector 14 has been described as thin and the disc 38 moves in only two dimensions, the tilt detector could be made three dimensional.

The foregoing disclosure and showings made in the drawings are merely illustrative of the principles of this invention and are not to be interpreted in a limiting sense. The scope of the invention is to be determined from the claims.

I claim:

1. A tilt detector comprising:
  a container;
  a receptacle having a closed end, an open end, and sides extending between the closed and open ends, the receptacle located within the container;
  a first mass located within the receptacle when the receptacle is upright with the open end above the closed end, the first mass capable of exiting the receptacle when the receptacle tilts beyond a predetermined angle;
  a second mass located above the receptacle open end when the receptacle is upright, whereby the second mass blocks the exit of the first mass from the upright receptacle, the second mass moving when the receptacle tilts beyond the predetermined angle so as to allow the first mass to exit the receptacle.

2. The tilt detector of claim 1 wherein the second mass is suspended from a pivot point spaced from and located over the receptacle open end when the receptacle is upright, the second mass pivoting away from the receptacle open end when the receptacle tilts beyond its predetermined angle.

3. The tilt detector of claim 1 wherein the first mass responds to first vibrational frequencies, the second mass responds to second vibrational frequencies, the second vibrational frequencies being different from the first vibrational frequencies.

4. The tilt detector of claim 3 wherein the first and second masses have different masses.

5. The tilt detector of claim 3 wherein the first and second masses are made of different materials.

6. The tilt detector of claim 1 wherein the second mass has extensions forming at least two outside lateral cavities having dimensions larger than the first mass and for blocking reentry of the first mass into the receptacle after exiting the receptacle.

7. A tilt detector comprising:
  a container;
  a receptacle having a closed end, an open end, and sides extending between the closed and open ends, the receptacle located within the container;
  a first mass located within the receptacle when the receptacle is upright with the open end above the closed end, the first mass capable of exiting the receptacle when the receptacle tilts beyond a predetermined angle;
  a pivot pin coupled to the container located adjacent to the open end of the receptacle;
  a second mass pivotally coupled to the pivot pin;
  the second mass having a blocking portion, the blocking portion blocking the open end of the receptacle when the receptacle is upright.

8. The tilt detector of claim 7 wherein the container is thin so that the first mass moves within the container in only two dimensions.

9. The tilt detector of claim 8 wherein the second mass has ribs on at least one side.

10. The tilt detector of claim 8 wherein the second mass has ribs on both sides, the ribs on one side being offset from the ribs on the other side.

11. The tilt detector of claim 7 wherein the second mass has extensions forming at least two outside lateral cavities having dimensions larger than the first mass and for blocking reentry of the first mass into the receptacle after exiting the receptacle.

12. The tilt detector of claim 7 further comprising a removable arming pin which can be inserted into a notch in the second mass to prevent movement of the second mass.

13. The tilt detector of claim 7 wherein at least a portion of the face of the container is transparent.

14. The tilt detector of claim 13 wherein the first mass is of a first color and the inside surface of a back of the container is of a second color.

15. The tilt detector of claim 7 wherein the pivot pin has plural radii circumscribed by a single circle.

16. The tilt detector of claim 7 wherein a lower edge of the second mass has a radius and a flat portion.

17. A method of preventing accidental activation of a tilt detector due to vibration, comprising the steps of:
  providing a receptacle with a first mass located therein, the receptacle having a closed end and an open end;
  blocking the exit of the first mass from the receptacle through the open end due to vibration by locating a blocking mass over the open end;
  moving the blocking mass away from the receptacle open end when the receptacle is tilted beyond a predetermined angle to allow the first mass to exit.

18. The method of claim 17 wherein the step of moving the blocking mass further comprises the step of swinging the blocking mass away from the open end.

19. The method of claim 17 wherein the step of blocking the exit of the first mass from the receptacle open end by locating a blocking mass over the open end further comprises the step of suspending the blocking mass over the receptacle open end.

* * * * *